(12) United States Patent
Jain

(10) Patent No.: US 8,342,350 B2
(45) Date of Patent: Jan. 1, 2013

(54) CONTAINERS WITH ANTI-SLIP PROVISIONS

(75) Inventor: Neeraj Jain, New Delhi (IN)

(73) Assignee: Loving Pets Corporation, Cranbury, NJ (US)

( * ) Notice: Subject to any disclaimer, the term of this patent is extended or adjusted under 35 U.S.C. 154(b) by 318 days.

(21) Appl. No.: 12/179,125

(22) Filed: Jul. 24, 2008

(65) Prior Publication Data

US 2010/0018970 A1  Jan. 28, 2010

(51) Int. Cl.
*A47G 19/00* (2006.01)
*B65D 21/02* (2006.01)
*B65D 3/22* (2006.01)
*B65D 8/04* (2006.01)
*B65D 25/24* (2006.01)

(52) U.S. Cl. ............... 220/23.89; 220/23.83; 220/23.87; 220/62.11; 220/574; 220/628; 220/630; 220/636

(58) Field of Classification Search ............... 220/23.83, 220/23.87, 23.89, 62.11, 574, 628, 630, 636
See application file for complete search history.

(56) References Cited

U.S. PATENT DOCUMENTS

| | | | | |
|---|---|---|---|---|
| 5,579,946 A | * | 12/1996 | Rowan et al. | 220/592.27 |
| 6,112,698 A | * | 9/2000 | Zelinger | 119/61.54 |
| 6,230,653 B1 | * | 5/2001 | Tobin | 119/72 |
| 6,516,747 B1 | * | 2/2003 | Willinger | 119/61.54 |
| RE39,391 E | * | 11/2006 | Jerstroem et al. | 220/574.3 |
| 2008/0105694 A1 | * | 5/2008 | Chen | 220/694 |

FOREIGN PATENT DOCUMENTS

CA  2543911 A1  5/2005

OTHER PUBLICATIONS

Canadian Patent Office Action dated Jul. 3, 2012, 2 pages.

* cited by examiner

*Primary Examiner* — Anthony Stashick
*Assistant Examiner* — Madison L Poos
(74) *Attorney, Agent, or Firm* — Fox Rothschild LLP

(57) ABSTRACT

Embodiments of containers such as bowls can include in outer shell, and an inner shell positioned at least in part within the outer shell. The inner shell can be formed from a material such as stainless steel. The outer shell can be formed from a material such as plastic. An anti-slip provision, such as a strip of elastomeric or other material, can be mounted on the outer shell.

9 Claims, 6 Drawing Sheets

CONTAINERS WITH ANTI-SLIP PROVISIONS

TECHNICAL FIELD

The embodiments disclosed herein are directed to containers, such as bowls, having provisions that discourage slipping of the containers across surfaces on which the containers are resting.

BACKGROUND

Stainless steel is widely considered a desirable material for water and food bowls used by dogs and other domesticated animals. In particular, scratches and gouges in a water or food bowl form areas that can promote the growth of harmful bacteria. Stainless steel is resistant to being scratched or gouged, in comparison to materials such as plastic. Thus, scratches or gouges that promote the growth of bacteria are not easily formed on stainless steel bowls.

It is desirable for a water or food bowl to have some type of anti-slip feature to prevent the bowl from being pushed across the floor as the animal is drinking. For example, a strip of elastomeric material that discourages slipping may be attached to the bottom of the bowl using glue or some other type of permanent affixation means. Elastomeric materials, however, often degrade and detach from the bowl after being subjected to multiple washing cycles in a dishwasher.

Mounting an anti-slip provision so that it can be removed quickly and easily before the bowl is placed in the dishwasher can present difficulties, particularly in bowls formed from stainless-steel. For example, retaining the anti-slip provision using an interference fit requires that recesses, channels, or other features be formed in the bowl to relatively close dimensional tolerances. The stamping process typically used to shape stainless steel bowls is generally unsuitable for forming features with requisite degree to precision needed achieve an effective interference fit with an anti-slip provision.

SUMMARY

Embodiments of containers such as bowls can include an outer shell, and an inner shell positioned at least in part within the outer shell. The inner shell can be formed from a material such as stainless steel. The outer shell can be formed from a material such as plastic. An anti-slip provision, such as a strip of elastomeric or other material, can be mounted on the outer shell.

BRIEF DESCRIPTION OF THE DRAWINGS

The foregoing summary, as well as, the following detailed description of preferred embodiments, are better understood when read in conjunction with the appended drawings. The drawings are presented for illustrative purposes only, and the scope of the appended claims is not limited to the specific embodiments shown in the drawings. In the drawings:

DETAILED DESCRIPTION

FIGS. 1-8 depict an embodiment of a bowl 10 with anti-slip provisions. The bowl 10 can be used, for example, as a watering bowl for a dog or other domesticated animal. The use of the bowl 10 for this particular application is disclosed for exemplary purposes only. The bowl 10, and alternative embodiments thereof, can be used in other applications.

Figure 2:
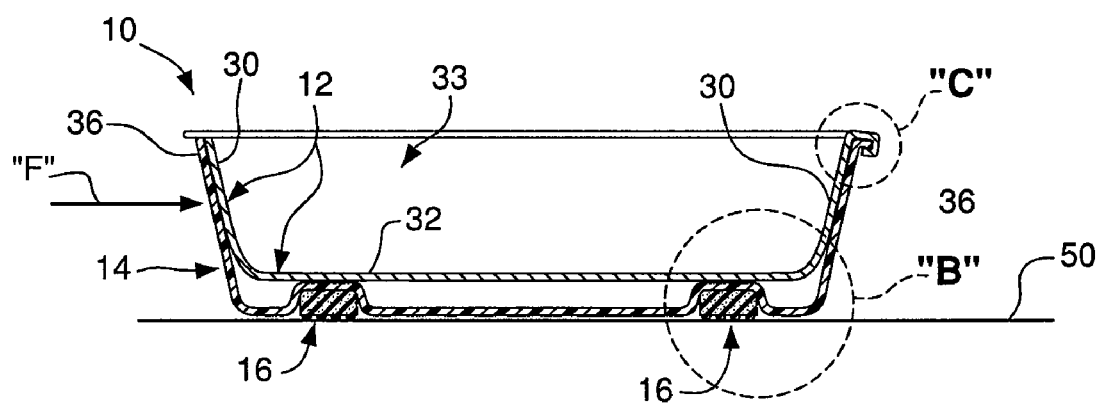
FIG. 2 is a cross-sectional view of the bowl shown in FIG. 1, taken through the line "A-A" of FIG. 4.

The bowl 10 is depicted in FIG. 2 as resting on a surface 50. The surface 50 can be, for example, a surface of a wooden or tile floor.

The bowl 10 comprises an inner shell 12, and an outer shell 14. The inner shell 12 can be stamped or otherwise formed from a metallic material such as stainless steel. The outer shell 14 can be formed from a non-metallic material such as a thermoplastic, thermosetting, or other plastic material, using injection molding or other suitable techniques.

Figure 8:
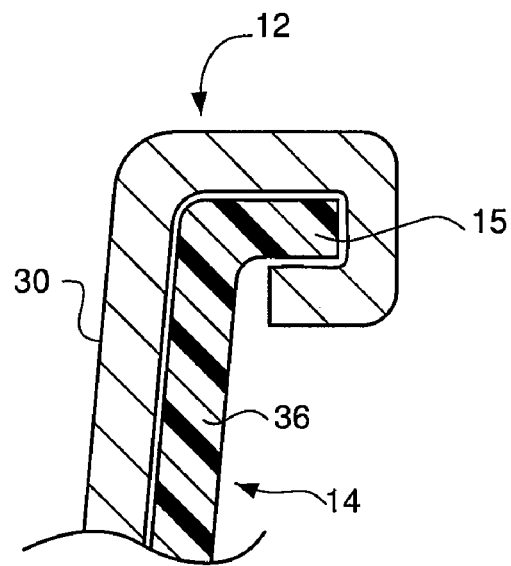
FIG. 8 is a magnified view of the area designated "C" in FIG. 2.

The inner shell 12 is sized and shaped to nest within the outer shell 14 as shown in FIG. 2. The inner shell 12 can be secured to the outer shell 14 by, for example, folding and crimping an upper edge of the inner shell 12 over a lip 15 formed along an upper edge of the outer shell 14, as shown in FIG. 8. The inner shell 12 can be secured to the outer shell 14 using other suitable means, such as fasteners or adhesives, in alternative embodiments.

The bowl 10 can also include an anti-slip feature in the form of a ring 16. The ring 16 is mounted on the outer shell 14, so that a bottom surface 17 of the ring 16 faces downward and contacts the surface 50 as depicted in FIG. 2.

Figure 1:
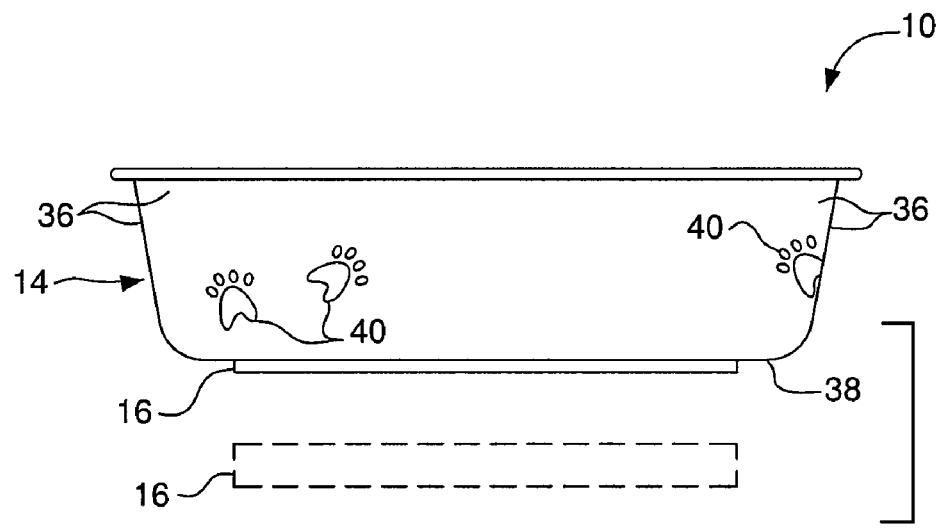
FIG. 1 is a side view of an embodiment of a bowl having an anti-slip provision in the from of a ring.

Directional terms such as "bottom," "top," "downward," "upward," "horizontal," "vertical," etc. are used with reference to the component orientations depicted in FIGS. 1 and 2. These terms are used for exemplary purposes only, and are not meant to limit the scope of the appended claims.

Figure 6:
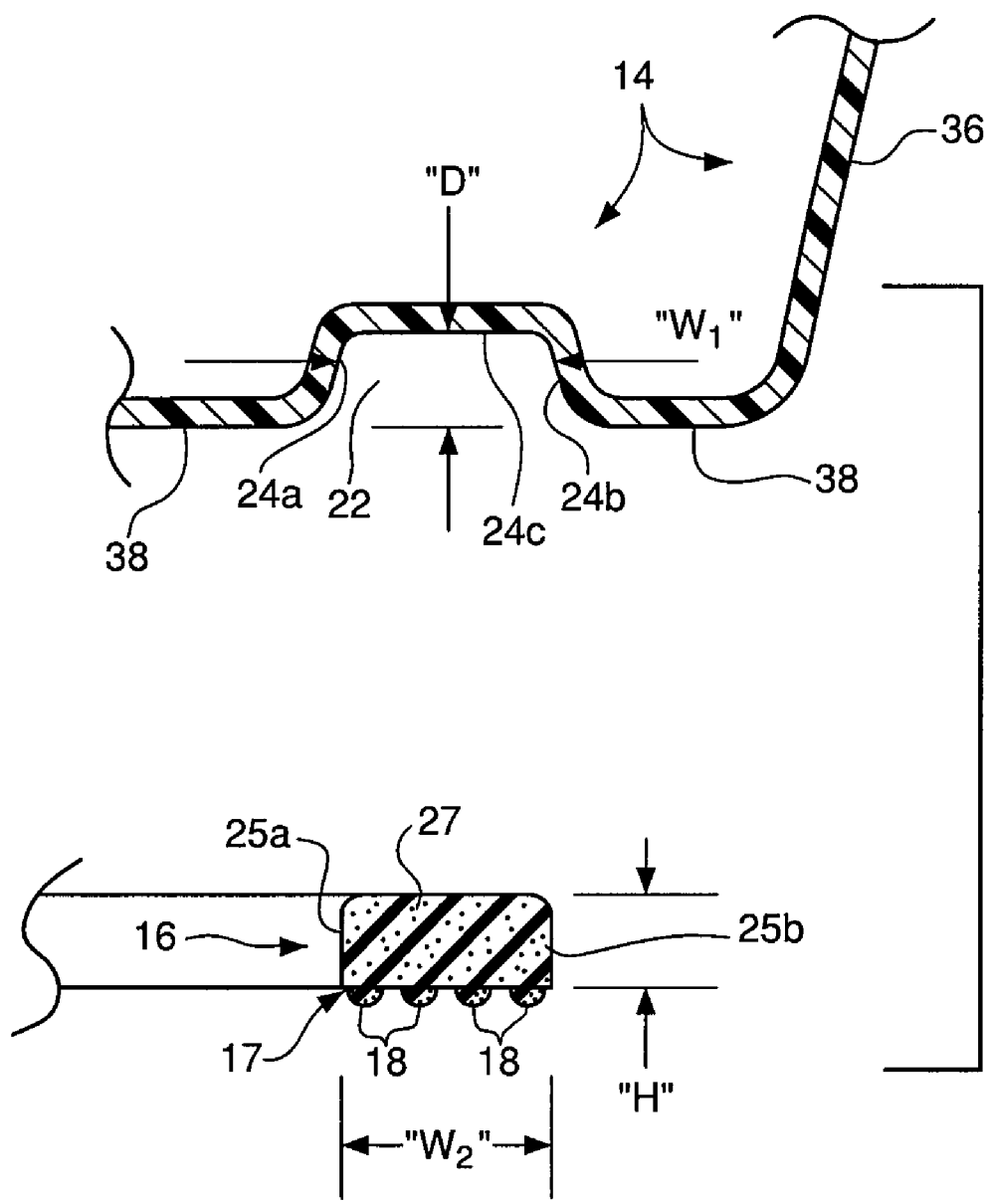
FIG. 6 is a magnified view of the area designated "B" in FIG. 2, with the ring removed from an outer shell of the bowl.
Figure 7:
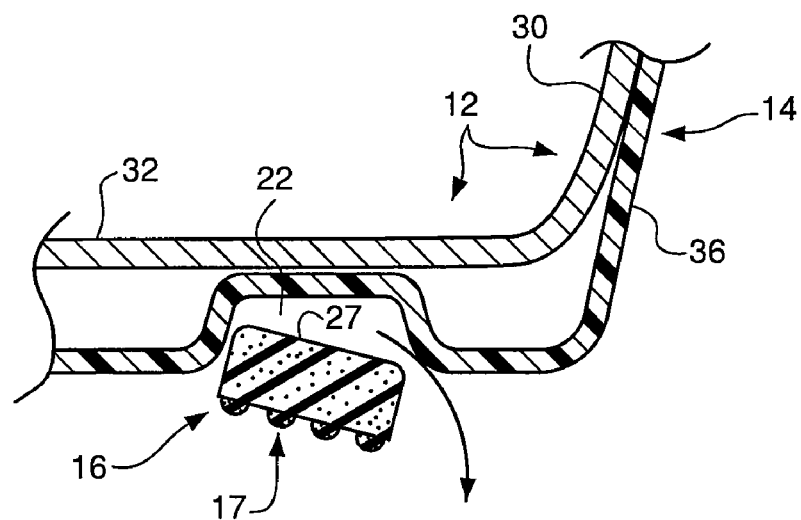
FIG. 7 is a magnified view of the area designated "B" in FIG. 2, depicting the ring being removed from the outer shell.

The ring 16 can mounted on the outer shell 14 in a manner that permits the ring 16 to be readily removed from and reinstalled on the outer shell 14. For example, the outer shell 14 can have a substantially circular, downwardly-facing recess in the form of a channel 22 formed therein, as shown in FIGS. 6 and 7. The channel 22 is defined by a first surface 24a, a second surface 24b, and a third surface 24c of the outer shell 14. The first surface 24a and the second surface 24b extend upward from the bottom surface 38 of the outer shell, are concentric, and form the sides of the channel 22. The third surface 24c adjoins the first and second surfaces 24a, 24b, and defines the top of the channel 22.

Figure 5:
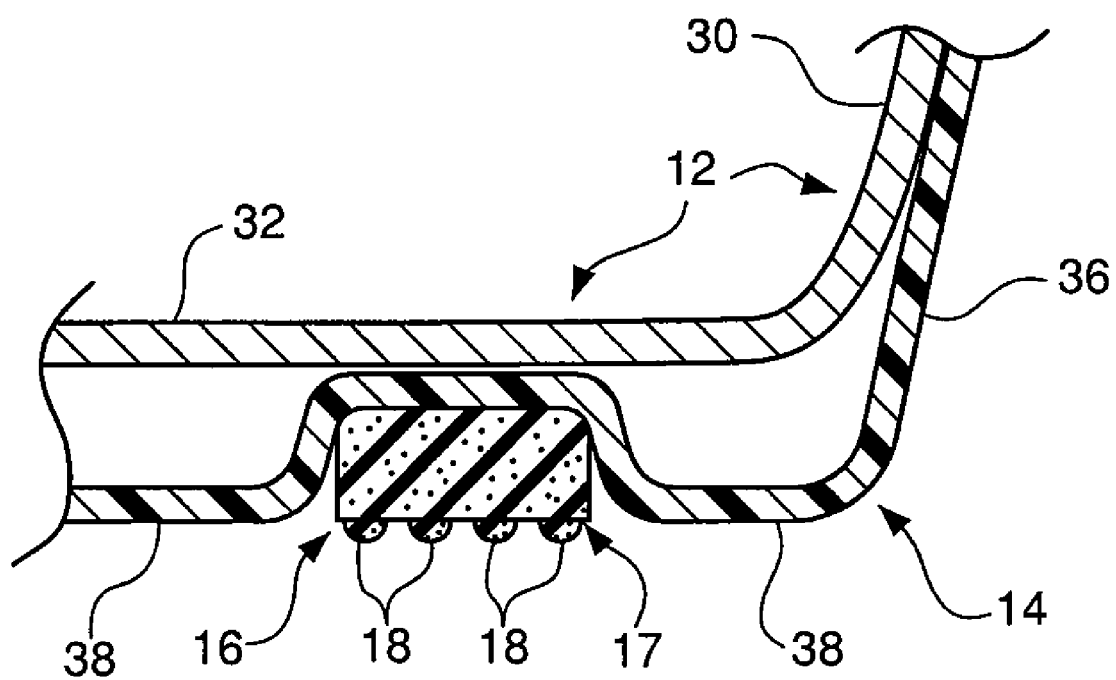
FIG. 5 is a magnified view of the area designated "B" in FIG. 2.

The bottom surface 17 of the ring 16 can have a plurality of concentric ridges, projections, or ribs 18 formed thereon, as shown in FIGS. 5-7. The ribs 18 are not depicted in FIG. 4, for clarity of illustration. The ribs 18, it is believed, can increase the friction between the ring 16 and the surface 50 when the surface 50 is wet. The ring 16 can be configured without the ribs 18 in alternative embodiments.

Figure 3:
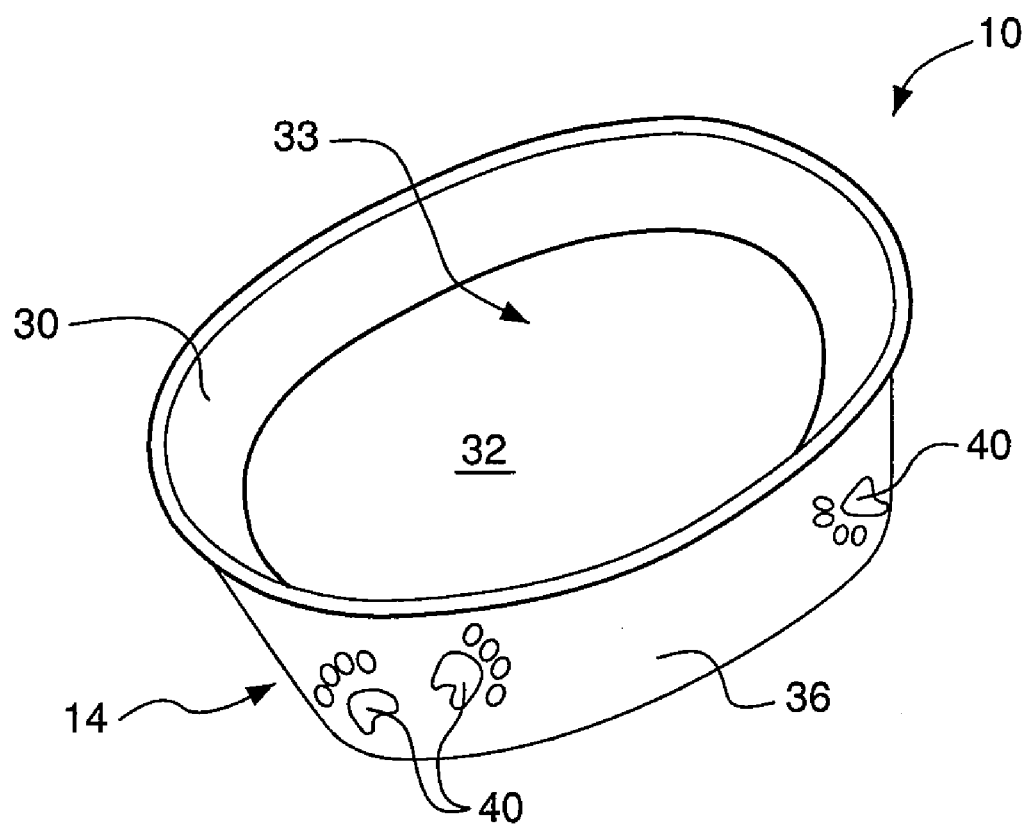
FIG. 3 is a top perspective view of the bowl shown in FIGS. 1 and 2.
Figure 4:
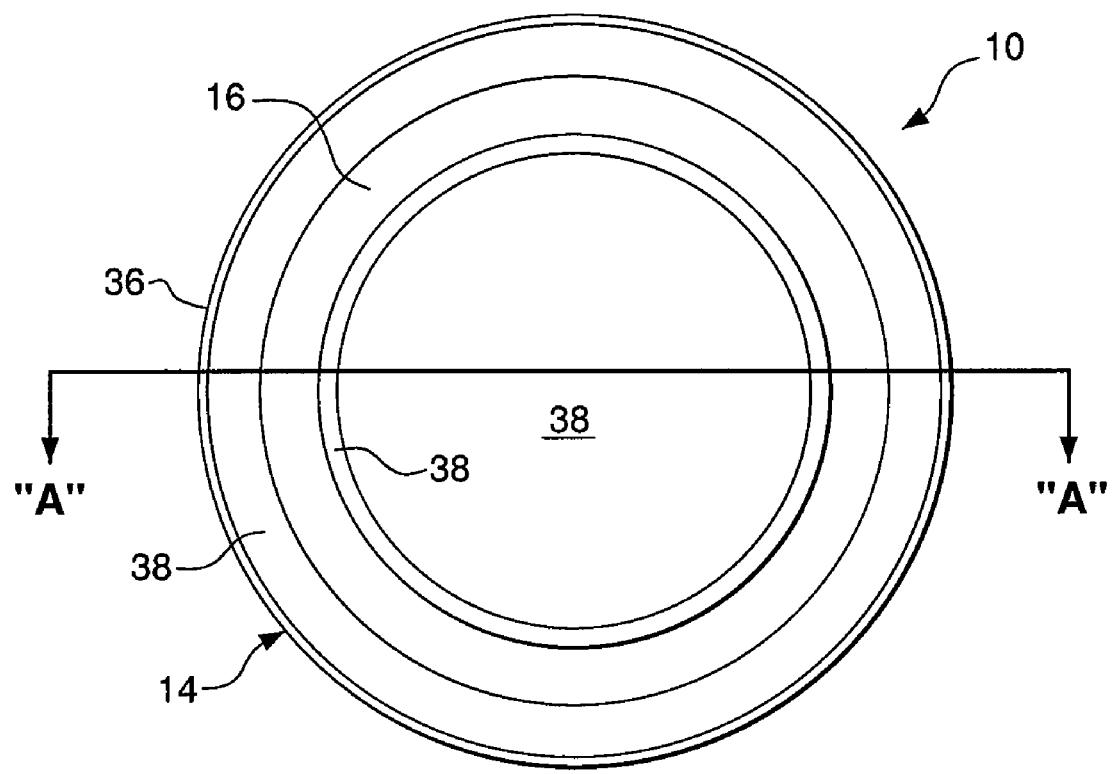
FIG. 4 is a bottom view of the bowl shown in FIGS. 1-3.

The inner shell 12 has a circumferentially-extending sidewall 30, and a substantially flat bottom surface 32 that adjoins the sidewall 30, as shown in FIGS. 2 and 3. The sidewall 30 and the bottom surface 32 define an open volume 33 that is capable of holding, for example, drinking water or food for an animal.

The outer shell 14 has a circumferentially-extending sidewall 36, and a bottom surface 38 that adjoins the sidewall 36.

The sidewall 30 and the sidewall 36 of the respective inner shell 12 and outer shell 14 can be angled upwardly and outwardly in relation to the vertical direction by, for example, approximately fifteen degrees. The sidewall 30 and the sidewall 36 can be vertically oriented, or can be angled upwardly and inwardly, in alternative embodiments.

The ring 16 can mounted on the outer shell 14 in a manner that permits the ring 16 to be readily removed from and reinstalled on the outer shell 14. For example, the outer shell 14 can have a substantially circular, downwardly-facing recess in the form of a channel 22 formed therein, as shown in FIGS. 6 and 7. The channel 22 is defined by a first surface 24a, a second surface 24b, and a third surface 24c of the outer shell 14. The first surface 24a and the second surface 24b extend upward from the bottom surface 38 of the outer shell, are concentric, and form the sides of the channel 22. The third surface 24c adjoins the first and second surfaces 24a, 24b, and defines the top of the channel 22.

The width of the channel 22 is denoted by the symbol "$W_1$" in FIG. 6, and is defined by the spacing between the first surface 24a and the second surface 24b. The width of the ring 16 is denoted by the symbol "$W_2$" in FIG. 6, and is defined by the spacing between an inner circumferential surface 25a and an outer circumferential surface 25b of the ring 16.

The ring 16 is retained within the channel 22 by an interference fit. In particular, the ring 16 and the outer shell 14 are configured so that the width $W_1$ of the channel 22 is approximately equal to, or slightly less than the width $W_2$ of the ring 16. As a result of this arrangement, the ring 16 is retained in the channel 22 by friction between the first and second surfaces 24a, 24b of the outer shell 14 and the respective inner and outer circumferential surfaces 24a, 24b of the ring 16.

The depth of the channel 22 is denoted by the symbol "D" in FIG. 6, and is defined by the height, or vertical dimension, of the first surface 24a and the second surface 24b of the outer shell 14. The height of the ring 16 is denoted by the symbol "H" in FIG. 6, and is defined by a distance between the bottom of the ribs 18 and a top surface 27 of the ring 16. The ring 16 and the outer shell 14 are configured so that the height H of the ring 16 is slightly greater than the depth D of the channel 22. As a result of this arrangement, the ribs 18 extend below a plane that intersects the bottom surface 38 of the outer shell 14, and the remainder of the bottom surface 17 of the ring 16 is approximately co-planar with the bottom surface 38 as shown in FIGS. 2 and 5. The ribs 18 thus contact the surface 50 when the bowl 10 is resting on the surface 50.

Contact between the ribs 18 and the surface 50 gives rise to a frictional force that resists slipping of the bowl 10 across the surface 50 when the bowl 10 is acted upon by the horizontal force component F. This can occur, for example, when a dog or other animal tries to push the bowl across the surface 50 as the animal is drinking therefrom. The frictional force can thus prevent the bowl 10 from being moved from a desired or selected location on the surface 50.

The ring 16 can be removed quickly and easily from the outer shell 14. For example, an individual desiring to remove the ring 16 can engage the lower edge of the outer circumferential surface 25b of the ring 16 with a fingernail, knife, or other object capable of catching hold of the relatively soft ring 16. The ring 16 can be lifted outward, away from the channel 22 as shown in FIG. 7, until enough of the ring 16 is exposed to permit the individual to grasp the ring 16. The entire ring 16 can then be pulled out of the channel 22.

The ring 16 can thus be removed from the outer shell 14 with a minimum of time and effort before the remainder of the bowl 10 is placed in a dishwasher. Subjecting an anti-slip provision such as the ring 16 to multiple dishwasher cycles can cause the anti-slip provision, and its attachment means, to degrade. Thus, configuring the ring 16 to be removable can eliminate this potential source of degradation and thereby prolong the useful life of the bowl 10.

A portion of the bottom surface 17 of the bowl is approximately co-planar with the bottom surface 38 of the outer shell 14, as shown in FIGS. 1 and 5. This feature can make it difficult for a dog or other animal to grasp the ring 16 in a manner that facilitates removal of the ring 16 from the channel 22.

The plastic material from which the outer shell 14 is formed is receptive to paint and ink. Thus, decorative features 40 can be painted or printed on an outer surface of the sidewall 36 of the outer shell 14, as shown in FIGS. 1 and 3. Stainless steel surfaces, by contrast, generally are not receptive to paint or ink, and thus to do not make suitable surfaces for painted or printed decorative features. Moreover, the plastic outer shell 14 is resistant to denting.

Features such as the channel 22 can be formed in the outer shell 14 to relatively close dimensional tolerances using injection molding or other suitable manufacturing techniques. The ability to form the channel 22 to relatively close tolerances can facilitate the use of an interfere fit to retain the ring 16 on the outer shell. An interference fit, in turn, can obviate the need for fasteners, posts, or other additional features to attach the ring 16 to the outer shell 14. Moreover, as discussed above, the use of an interference fit facilitates removal of the ring 16 from the outer shell 14 with a minimum of time and effort. By contrast, it can be difficult or otherwise unfeasible to form features such as the channels 22 in a stainless steel shell with the requisite degree of precision needed to facilitate an interference fit with the ring 16, using stamping or other metalworking techniques.

The water held within the volume 33 of the bowl 10 is exposed to the stainless steel inner shell 12. The use of stainless steel, as discussed above, reduces the potential for the water to be exposed to harmful bacteria. Moreover, the use of the plastic outer shell 14 permits features such as the channels 22 to be formed in the bowl 10 with the precision required to facilitate an interference fit with the ring 16. Moreover, the plastic facilitates the use of decorative features 40 on the sidewall 36 of the outer shell 14.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, can make numerous modifications to the invention as described herein, and changes may be made without departing from the scope and spirit of the invention as defined by the appended claims.

For example, an embodiment in the form of a bowl 10 for holding water for a domesticated animal is disclosed for exemplary purposes only. The principles disclosed herein can be applied to other types of containers, including but not limited to dishes and bowls used to hold food for human consumption. Moreover, alternative embodiments within the contemplated scope of the invention can be formed without any anti-slip provisions.

Alternative embodiments of the bowl 10 can be shaped differently than the bowl 10. Moreover, the use of a circular, continuous ring 16 as an anti-slip provision is disclosed for exemplary purposes only. The anti-slip provisions can have other shapes in alternative embodiments. For example, the anti-slip provisions can be tailored to the shape of the bottom surface of the container with which the anti-slip provision is used. Thus, a container having a rectangular bottom surface can include a rectangular anti-slip provision. Furthermore, the anti-slip provision, and the channel that accommodates it, can be formed in multiple segments in alternative embodiments. Also, the ring 16 can be retained on the outer shell 14 by a means other than an interference fit in alternative embodiments.

What is claimed is:

1. An animal water and food bowl which resists tipping and slipping when being used by the animal and which comprises:
    a rigid first shell formed from a thermoplastic, thermosetting, or other plastic material which is resistant to denting and is receptive to paint or ink, the first shell having a top, a bottom having a predetermined length, and an outer wall extending between the bottom and the top of the first shell in a substantially straight line, wherein the predetermined length of the bottom is greater than a length of the outer wall between the top and the bottom of the first shell;
    a second shell formed from stainless steel and positioned at least in part within the first shell, the second shell having an outer wall extending between a bottom and a top of the second shell in a substantially straight line; and
    an anti-slip provision removably mounted on the first shell, wherein the anti-slip provision comprises a ring of an elastomeric material removably mounted in a recess formed in the bottom of the first shell using an interference fit between the ring and the first shell, and the ring of elastomeric material has a plurality of concentric ribs.

2. The bowl of claim 1, wherein printed matter is displayed on an outer surface of the second shell.

3. The bowl of claim 1, wherein the ring has a bottom surface, and at least a portion of the bottom surface is substantially co-planar with a bottom surface of the first shell.

4. The bowl of claim 1, wherein: the second shell comprises a sidewall and a substantially planar bottom portion that adjoins the sidewall; and the sidewall and the bottom portion define an open volume capable of holding a liquid.

5. The bowl of claim 1, wherein an upper edge of the second shell is folded around a lip of the first shell to secure the second shell to the first shell.

6. The bowl of claim 1, wherein the bottom of the first shell is substantially circular in shape and the predetermined length is a diameter of the substantially circular shape.

7. The bowl of claim 1, wherein the plastic material comprises a thermoplastic material.

8. The bowl of claim 1, wherein the bottom of the second shell is substantially flat.

9. An animal water and food bowl which resists tipping and slipping when being used by the animal and which comprises:
    a rigid first shell formed from a thermoplastic, thermosetting, or other plastic material which is resistant to denting and is receptive to paint or ink, the first shell having a top, a bottom being circular in shape and having a diameter, and an outer wall extending between the bottom and the top of the first shell in a substantially straight line, wherein the diameter of the bottom is greater than a length of the outer wall between the top and the bottom of the first shell, and printed matter is displayed on an outer surface of the outer wall;
    a second shell formed from stainless steel and positioned at least in part within the first shell, the second shell having an outer wall extending between a bottom and a top of the second shell in a substantially straight line, the bottom of the second shell being substantially flat and adjoining the outer wall of the second shell, the outer wall and the bottom of the second shell defining an open volume capable of holding a liquid; and
    an anti-slip provision removably mounted on the first shell, wherein the anti-slip provision comprises a ring of an elastomeric material removably mounted in a recess formed in the bottom of the first shell using an interference fit between the ring and the first shell, and the ring of elastomeric material has a plurality of concentric ribs.

* * * * *